G. HOPSON.
Axles for Vehicles.
No. 148,064. Patented March 3, 1874.
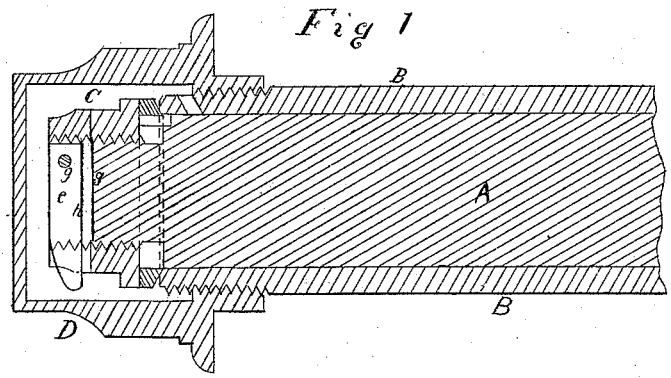
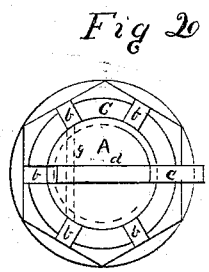

UNITED STATES PATENT OFFICE.

GEORGE HOPSON, OF BRIDGEPORT, CONNECTICUT.

IMPROVEMENT IN AXLES FOR VEHICLES.

Specification forming part of Letters Patent No. 148,064, dated March 3, 1874; application filed February 15, 1873.

*To all whom it may concern:*

Be it known that I, GEORGE HOPSON, of Bridgeport, county of Fairfield, State of Connecticut, have invented an Improved Axle, of which the following is a specification:

My invention relates to the manner of locking the nut by which the wheel is secured on the axle; and consists in the use of a latch, hinged in a groove on end of the axle, and a series of grooves in the outer edge of nut, in which it drops when shut, the object being to secure the nut from turning at any desired point.

In the drawings, Figure 1 is a longitudinal section. Fig. 2 is an end view.

A is the axle; B, the box; c, the nut; d, the groove in end of axle; e, the latch; f f f, the series of grooves in nut for the latch e; g, the pin-securing latch; h, the spring that holds the latch open or shut. On the end of axle A the usual thread is cut. Across the end, and central, a groove is formed. In this the latch is hinged by the pin g. This is set one side of the center, allowing for clearance of nut on that end of latch. The opposite end extends beyond the thread far enough to give the requisite bearing in the grooves of nut c. To keep the latch in lock, the spring p is placed at its foot. This spring also keeps it in an open position when removing the nut to get to the axle. On the outer edge of this nut, and of sufficient depth to allow for the wear of box, the grooves or catches f f f are formed, their longitudinal direction to the center of axle. The thread on the axle is cut somewhat longer than the nut, thus preventing the nut coming to a shoulder before it bears on the box B.

It operates as follows: The wheel is set on the axle, the back end of box bearing against a re-enforce on axle. The nut e is then screwed onto the axle till it bears on the leather washer between it and the box B. Then one of the grooves f is set on a line with groove d, and the latch e turned down into it, which prevents its turning either way. On the end of box, at 1, a thread is also cut in opposite directions to that of axle, and the nut D fitted to it, which covers the nut B. In this nut is a chamber for retaining oil for lubricating the axle, which finds passage to it through the hole d.

What I claim as new, and desire to secure by Letters Patent, is—

The spindle A, having the groove d, the latch e, pivoted in said groove by pin g, and held in position by the spring h, the nut c, with the series of grooves f f f in its face for the reception of the end of latch c, all combined as described, and for the purpose specified.

In testimony whereof I have signed my name to this specification before two subscribing witnesses.

GEORGE HOPSON.

Witnesses:
JAMES KING,
JAMES A. BURKE.